United States Patent [19]

Yoshida et al.

[11] Patent Number: 4,780,260

[45] Date of Patent: Oct. 25, 1988

[54] METHOD FOR PRODUCING SILICONE RUBBER MOLDINGS HAVING A HARD EXTERIOR LAYER

[75] Inventors: Keiji Yoshida; Koji Shimizu, both of Ichihara; Mitsuo Hamada, Kisarazu, all of Japan

[73] Assignee: Toray Silicone Company, Ltd., Tokyo, Japan

[21] Appl. No.: 95,795

[22] Filed: Sep. 14, 1987

[30] Foreign Application Priority Data

Sep. 24, 1986 [JP] Japan ................................ 61-225215

[51] Int. Cl.$^4$ ............................................... B28B 7/22
[52] U.S. Cl. .................... 264/255; 264/338; 106/38.22; 427/387; 427/407.1; 427/409; 528/15; 528/24; 528/31; 528/32; 525/477; 525/478
[58] Field of Search ............................ 264/338, 255; 106/38.22; 427/387, 407.1, 409; 528/15, 24, 31, 32; 525/477, 478

[56] References Cited

U.S. PATENT DOCUMENTS 4,517,238  5/1985  Mine et al. ......................... 428/212

FOREIGN PATENT DOCUMENTS 59-30932  1/1984  Japan .

*Primary Examiner*—Melvyn I. Marquis
*Attorney, Agent, or Firm*—Robert Spector

[57] ABSTRACT

The present invention provides a method for producing silicone rubber moldings composed of a uniform, smooth and hard exterior layer and a relatively soft interior portion. In accordance with this method the surfaces of the mold cavity are coated with an organohydrogenpolysiloxane containing at least two silicon-bonded hydrogen atoms before the curable organosiloxane used to form the interior portion of the molding is injected into the mold cavity and cured.

7 Claims, No Drawings

METHOD FOR PRODUCING SILICONE RUBBER MOLDINGS HAVING A HARD EXTERIOR LAYER

BACKGROUND OF THE INVENTION

1. Field of the Invention

The present invention relates to a method for producing silicone rubber moldings. More particularly, this invention relates to a method for producing silicone rubber moldings having a smooth, hard exterior layer and a relatively soft interior portion without the necessity of appling a coating to a finished, cured molding.

2. Description of the Prior Art

Unitary silicone moldings composed of a hard exterior layer and a relatively soft interior portion are used as buffering elements and protective coating elements. With regard to methods for producing such moldings. Japanese Patent Publication Number 59-30932 [30,932/84] discloses a method in which a porous element, for example, a sponge or a cloth is impregnated with a room temperature-curable silicone rubber to afford an uncured or semi-cured gel-form molding. This molding is then immersed in a curing agent for the silicone rubber and the molding's exterior layer is completely cured. U.S. Pat. No. 4,517,238. which issued to Mine et al. on May 14, 1985 teaches forming a molded product by applying an addition reaction curable organosiloxane composition to the surface of a substrate and then applying only the organohydrogensiloxane reactant of said composition as a coating. The coating forms a highly crosslinked layer on the surface following curing of the composition.

The disadvantage of the aforementioned prior art methods is their inability to produce moldings with good dimensional accuracy and a uniform, hard coating on the surface of the cured article. Furthermore, the methods used to produce these prior art cured articles are complex, requiring a step during which the organohydrogensiloxane is applied as a coating to the molded article followed by a second step during which all of the materials are cured. The maximum rate at which cured articles can be produced is therefore relatively low.

The present inventors conducted a vigorous investigation with a view to eliminating the aforementioned problems, and the present invention was developed as a result.

SUMMARY OF THE INVENTION

One objective of the present invention is to provide a method for the production of silicone rubber moldings composed of a uniform, smooth and hard exterior layer and a relatively soft interior portion. This objective is achieved by coating the surfaces of the mold cavity with an organohydrogenpolysiloxane containing at least two silicon-bonded hydrogen atoms before the curable organosiloxane used to form the molding is injected into the mold and cured.

DETAILED DESCRIPTION OF THE INVENTION

This invention provides a method for producing a unitary silicone rubber molding comprising a hard exterior layer and a relatively soft interior portion, said method comprising the sequential steps of (1) coating an organohydrogenpolysiloxane having at least 2 silicon-bonded hydrogen atoms in each molecule on the surface of a mold cavity, (2) filling said mold cavity with a liquid heat-curable silicone rubber composition and (3) thermally curing said organohydrogenpolysiloxane and said liquid silicone rubber composition.

The inventive feature of the present method resides in coating the entire mold cavity with an organohydrogenpolysiloxane having at least 2 silicon-bonded hydrogen atoms in each molecule and curing this compound while it is in contact with a heat-curable liquid silicone rubber composition. During this process the organohydrogenpolysiloxane forms a hard exterior layer on the resultant cured silicone rubber molding.

The organohydrogenpolysiloxane must contain at least 2 and preferably at least 3 silicon-bonded hydrogen atoms in each molecule. The molecular configuration of this component is not specifically restricted and may be straight chain, branch-containing straight chain, or cyclic. The use of compounds containing branched configurations is preferred, particularly when it is necessary to form a tough skin on the surface of the silicone rubber molding. Organohydrogenpolysiloxanes of this type include copolymers composed of $(CH_3)_2HSiO_{1/2}$ units and $SiO_{4/2}$ units or copolymers composed of $(CH_3)_3SiO_{1/2}$ units, $(CH_3)_2HSiO_{1/2}$ units, and $SiO_{4/2}$ units.

Specific examples of suitable organohydrogenpolysiloxanes include but are not limited to trimethylsiloxy-terminated methylhydrogenpolysiloxanes, trimethylsiloxy-terminated dimethylsiloxane-methylhydrogensiloxane copolymers, dimethylhydrogensiloxy-terminated dimethylsiloxane-methylhydrogensiloxane copolymers, dimethylsiloxane-methylhydrogensiloxane cyclic copolymers, copolymers composed of $(CH_3)_2HSiO_{1/2}$ units and $SiO_{4/2}$ units, and copolymers composed of $(CH_3)_3SiO_{1/2}$ units, $(CH_3)_2HSiO_{1/2}$ units, and $SiO_{4/2}$ units.

Suitable methods for applying the organohydrogenpolysiloxane to the surfaces of the mold cavity include but are not limited to spraying, brushing, and application by a sponge. Any of these are useful when practicing the present method.

The amount of organohydrogenpolysiloxane applied to the mold cavity is not critical, so long as a continuous coat is formed on the interior surface of the mold.

Heat-curable liquid silicone rubber compositions that can be used in accordance with the present method are those based on at least one liquid, reactive group-containing organopolysiloxane in combination with a crosslinker and/or a curing catalyst. The curable compositions have the consistency of a liquid or a paste at room temperature. These compositions cure to a rubbery elastomer by standing at room temperature or when heated. Both self-supporting and non-self-supporting types of curable compositions can be used in practicing the present method.

The mechanisms by which liquid silicone rubber compositions suitable for use in the present method cure include a hydrosilation type addition-reaction conducted in the presence of a platinum catalyst, a free radical reaction initiated by an organoperoxide and condensation reactions that typically involve silicon-bonded hydroxyl groups. Of these various curing mechanisms, the hydrosilation reaction is preferred based on its rapid rates and uniformity of curing.

Particularly preferred liquid silicone rubber compositions that cure by a platinum-catalyzed hydrosilation reaction comprise (A) an organopolysiloxane containing at least 2 lower alkenyl radicals in each molecule, (B) an organohydrogenpolysiloxane having at least 2 silicon-bonded hydrogen atoms in each molecule, in an amount sufficient to provide from 0.1 to 1 mole of silicon-bonded hydrogen atoms for each mole of lower alkenyl radicals present in component (A), and (C) a plainum-type catalyst in an amount equivalent to from 0.1 to 1,000 parts by weight of platinum metal for each 1,000,000 weight parts of the total quantity of components (A) and (B).

A requirement for this preferred type of curable composition is that the sum of the number of alkenyl radicals in each molecule of component (A) and the number of hydrogen atoms in each molecule of component (B) be at least 5.

Component (A) is the principal component of one preferred class of curable liquid silicone rubber compositions used in accordance with the present method, and it reacts with component (B) in the presence of a platinum group metal or compound thereof, component (C), to produce a cured silicone rubber. Each molecule of component (A) must contain at least 2 lower alkenyl radicals bonded to silicon. When less than 2 lower alkenyl radicals are present, a network structure cannot be formed, and a good cured product cannot be obtained.

The lower alkenyl radicals present in component (A) are exemplified by vinyl, allyl, and propenyl. The lower alkenyl radicals can be present at any position in the molecule, but they are preferably present at least at the molecular terminals. Furthermore, the molecular configuration of component (A) can be straight chain, branch-containing straight chain, cyclic, or network, but a straight chain configuration, possibly slightly branched, is preferred. The molecular weight of this component is not specifically restricted. While the viscosity may range from that of a low-viscosity liquid to a very high-viscosity gum, the viscosity at 25 degrees C. is preferably at least 100 cP (0.1 Pa.s) in order to obtain a rubbery elastomeric cured material.

Suitable vinyl-containing organopolysiloxanes include but are not limited to methylvinylpolysiloxanes, methylvinylsiloxane-dimethylsiloxane copolymers, dimethylvinylsiloxy-terminated dimethylpolysiloxanes, dimethylvinylsiloxy-terminated dimethylsiloxane-methylphenylsiloxane copolymers, dimethylvinylsiloxy-terminated dimethylsiloxane-diphenylsiloxane-methylvinylsiloxane copolymers, trimethylsiloxy-terminated dimethylsiloxane-methylvinylsiloxane copolymers, trimethylsiloxy-terminated dimethylsiloxane-methylvinylsiloxane copolymers, dimethylvinylsiloxy-terminated methyl(3,3,3-trifluoropropyl)polysiloxanes, dimethylvinylsiloxy-terminated dimethylsiloxane-methyl(3,3,3-trifluoropropyl)siloxane copolymers, and polysiloxanes composed of $CH_2=CH(CH_3)_2SiO_{1/2}$, $(CH_3)_3SiO_{1/2}$ and $SiO_{4/2}$ units. Combination of two or more of the aforesaid organopolysiloxanes can be used in the present invention.

Component (B) of the preferred curable compositions is the crosslinker for component (A). Curing proceeds by the addition reaction of the silicon-bonded hydrogen atoms in this component with the lower alkenyl radicals groups in component (A) under the catalytic activity of component (C). Component (B) must contain at least 2 silicon-bonded hydrogen atoms in each molecule in order to function as a crosslinker.

The sum of the number of alkenyl radicals in each molecule of component (A) plus the number of silicon-bonded hydrogen atoms in each molecule of component (B) must be at least 5. It is undesirable for this sum to be less than 5 because a network structure essentially cannot then be formed, and an excellent cured article cannot be obtained.

The molecular configuration of component (B) is not specifically restricted, and it can be straight chain, branch-containing straight chain, or cyclic. While the molecular weight of this component is similarly not specifically restricted, the viscosity at 25 degrees C. is preferably from 1 to 50,000 cP (0.001 to 50 Pa.s) in order to obtain a good miscibility with component (A).

The quantity of addition of component (B) is preferably defined by the condition that the molar ratio of the total number of silicon-bonded hydrogen atoms in this component to the total quantity of all lower alkenyl radicals in component (A) is from 0.5:1 to 20:1. When this molar ratio is less than 0.5:1, a well cured composition will not be obtained. When this molar ratio exceeds about 20:1, there is a tendency for the hardness of the cured composition to increase when heated. Furthermore if additional resinous organosiloxanes having large concentrations of alkenyl radicals are added to the present compositions for the purpose of reinforcement or other reason, it is preferred that a supplementary amount of component (B) be added to react with these additional alkenyl radicals.

Examples of this component (B) include but are not limited to trimethylsiloxy-terminated methylhydrogenpolysiloxanes, trimethylsiloxy-terminated dimethylsiloxane-methylhydrogensiloxane copolymers, dimethylhydrogensiloxy-terminated dimethylsiloxane-methylhydrogensiloxane copolymers, dimethylsiloxane-methylhydrogensiloxane cyclic copolymers, copolymers composed of $(CH_3)_2HSiO_{1/2}$ units and $SiO_{4/2}$ units, and copolymers composed of $(CH_3)_3SiO_{1/2}$ units, $(CH_3)_2HSiO_{1/2}$ units, and $SiO_{4/2}$ units.

Component (C) is a catalyst for the addition reaction of silicon-bonded hydrogen atoms with alkenyl radicals. Suitable catalysts include metals from the platinum group of the periodic table of the elements and compound of these metals. Concrete examples of catalysts include but are not limited to chloroplatinic acid, chloroplatinic acid dissolved in an alcohol or ketone as well as such solutions which have been ripened, chloroplatinic acid-olefin complexes, chloroplatinic acid-alkenylsiloxane complexes, chloroplatinic acid-diketone complexes, platinum black and platinum supported on a carrier.

The concentration of component (C) in the present curable compositions is typically equivalent to from 0.1 to 1,000 ppm of platinum-group metal, based on the total weight of components (A) and (B). Crosslinking will not proceed satisfac-torily at below 0.1 ppm of component (C), while exceeding 1,000 weight ppm is uneconomical. Typically a concentration of from 1 to 100 ppm is preferred.

A filler can be present in the present curable liquid silicone rubber compositions to adjust the viscosity or improve the mechanical strength of the final cured article. These fillers are exemplified by reinforcing fillers such as precipitated silica, fumed silica, calcined silica and fumed titanium dioxide, and by non-reinforcing fillers such as quartz powder, diatomaceous earth, asbestos, aluminosilicic acid, iron oxide, zinc oxide and calcium carbonate. The fillers may be used without prior treatment or can be treated with an organosilicon compound such as hexamethyldisilazane, trimethylchlorosilane or a hydroxyl terminated dimethylpolysiloxane before being combined with the other ingredients of the heat-curable liquid silicone rubber composition.

In addition to a filler, the present class of liquid compositions that cure by a platinum catalyzed addition reaction can contain other optional ingredients including but not limited to pigments, heat stabilizers, flame retardants, plasticizers and organopolysiloxanes having one alkenyl radical per molecule, the latter being for the purpose of reducing the modulus of the final cured article.

A small or very small amount of a curing reaction-retarding additive such as an acetylenic compound, a hydrazine, a triazole, a phosphine or a mercaptan can be added to the present curable compositions unless this adversely affects the objective of the invention.

A second preferred type of heat-curable liquid silicone rubber composition cures by a free radical mechanism initiated by decomposition of an organoperoxide. These compositions comprise a vinyl-containing diorganopolysiloxane which is liquid at room temperature, and a catalytic quantity of an organoperoxide. Inorganic fillers, for example, fumed silica or precipitated silica, heat stabilizers, and pigments can be added as necessary. The decomposition temperature of the organoperoxide is preferably within the range of from 25 to 100 degrees C.

The smooth, hard exterior layer of cured molded articles produced in accordance with the present invention consists of a cured silicone material having a relatively high crosslink density and high hardness with respect to the interior portion of the article. When the cured article is a vibration-resistant element or buffering member, the hardness value of the exterior layer is preferably at least 40, the value being measured using a Japan Industrial Standards (JIS) rubber hardness meter.

The thickness of the exterior layer will vary with the curing temperature conditions for the liquid silicone rubber, but generally is no greater than 1,000 microns.

The relatively soft inter portion of the present cured molded articles consists of a cured silicone material having a relatively low crosslink density and low hardness with respect to the exterior layer. The hardness value of this inner portion is preferably no greater than 10 as measured using the aforementioned JIS rubber hardness meter.

The material from which the mold used in the present method is formed can be of metal, silicone rubber, or any of the synthetic resins such as polyesters and polyamides that have previously been used in the molding of liquid silicone rubber compositions. No specific restriction apply to the mold other than its ability to provide a molded article by being filled with a liquid silicone rubber composition that is subsequently cured.

With regard to methods for charging the liquid silicone rubber composition into the interior of the mold and thermally curing it, molding methods generally used for liquid silicone rubber compositions can be employed, for example, compression molding, transfer molding, and injection molding.

The curing temperature, also referred to herein as the molding temperature, for liquid silicone rubber composition processed in accordance with the present method, will generally be in the range of from 50 to 220 degrees C. and preferably in the range of from 50 to 170 degrees C. The curing rate of the liquid silicone rubber composition will be too low at lower temperatures and the production rate will be reduced as a result. At higher temperatures, the silicone rubber will adhere to the interior surface of the mold, thus impeding de-molding of the cured article.

EXAMPLES

The following examples describe preferred embodiments of this invention and should not be interpreted as limiting the scope of the invention described in the accompanying claims. Unless otherwise indicated, all parts and percentages in the examples are by weight, and all viscosities were measured at 25 degrees C.

EXAMPLE 1

25 Parts dry-method silica having a specific surface area of 200 $m^2/g$ and 0.5 parts trimethylsiloxy-terminated methylhydrogenpolysiloxane having a viscosity of 10 centipoise (0.01 Pa.s) and a SiH content of 0.9 wt % were added and mixed into 100 parts dimethylvinylsiloxy-terminated dimethylpolysiloxane having a viscosity of 2,000 centipoise (2 Pa.s) and a vinyl content of 0.23 percent to yield a mixture having a viscosity of 5,000 poise (500 Pa.s) at a shear rate of 10 sec$^{-1}$. A heat curable liquid silicone rubber composition of this invention was prepared by adding 0.1 part of an isopropanol solution of chloroplatinic acid solution having a platinum content of 3 weight percent of this mixture and blending the resultant composition to homogeneity.

The chromium-plated cavity of a metal mold was uniformly coated with a methylhydrogenpolysiloxane having a silicon-bonded hydrogen atom content of 1.0 wt %. The amount of material applied was equivalent to a coating weight of 0.2 g per square meter. The liquid silicone rubber composition described in the firt section of this example was then poured into the cavity interior, followed by thermal curing of the composition at 150 degrees C. for 10 minutes. The silicone molding was removed after cooling, its cross section exposed by cutting with a knife, and the hardness of the surface and interior portion of the molding were measured using a JIS Rubber Hardness Meter. The hardness of the exterior layer was 50, the hardness of the interior layer was 10. The thickness of the exterior layer was 0.5 mm.

EXAMPLE 2

A liquid silicone rubber composition was prepared by combining and mixing 100 parts of a dimethylvinylsiloxy-terminated dimethylpolysiloxane having a viscosity of 2,000 centipoise (2 Pa.s) and a vinyl content of 0.23 wt %, 20 parts of a dry-method silica having a specific surface area of 200 $m^2/g$, 0.4 parts of a trimethylsiloxy-terminated methylhydrogenpolysiloxane containing 1.0 wt % of silicon-bonded hydrogen and 0.1 part of an isopropanol solution of chloroplatinic acid solution containing 3 wt % of elemental platinum. The entire surface of the mold cavity of a mold used for injection molding was sprayed with the same methylhydrogenpolysiloxane used to prepare the curable composition described in the first part of this example.

The metal mold was then heated to 120 degrees C. and the liquid silicone rubber composition prepared as described in the first part of this example was then injected into its interior and cured as described in the preceding Example 1. The resultant cured molding consisted of a unitary silicone rubber article with an exterior layer having a hardness of 38 and a low interior portion having a hardness of 3, measured as described in Example 1.

EXAMPLE 3

A mixture (I) having a viscosity of 800 poise at a shear rate of 10 sec-$^1$ was prepared by combining and mixing to homogeneity 100 parts of a dimethylvinylsiloxy-terminated dimethylpolysiloxane having a viscosity of 2,000 centipoise and a vinyl content of 0.23 wt %, 10 parts of carbon black available as Denka Black from Denki Kagaku Kogyo Kabushiki Kaisha, and 0.3 parts of a trimethylsiloxy-terminated methylhydrogenpolysiloxane having a viscosity of 10 centipoise and containing 0.8 wt % silicon-bonded hydrogen atoms.

A heat-curable liquid silicone rubber composition of this invention was prepared by adding 0.1 part of an isopropanol solution of chloroplatinic acid solution containing the equivalent of 3 wt % an elemental platinum to mixture I and blending the resultant composition to homogeneity.

A metal mold cavity measuring 12 mm×30 mm was sprayed with a 10% toluene solution of methylhydrogenpolysiloxane containing 1.0% of silicon-bonded hydrogen atoms in an amount sufficient to produce a coating weight of 5 g/m$^2$. After the coating had dried, the liquid silicone rubber composition described in the first part of this Example was poured into the cavity and then thermally cured at 150 degrees C. for 5 minutes. The resultant unitary silicone molding had a hard surface layer and a gel-form interior.

The electrical resistance of the cured molded article was 500 ohms. When compressed to 50 percent of its initial thickness the electrical resistance of the article decreased to 250 ohms.

EXAMPLE 4

A liquid silicone rubber composition having a viscosity of 13,000 poise (1300 Pa.s) at a shear rate of 10 sec-$^1$ was prepared by combining and mixing 100 parts of a dimethylvinylsiloxy-terminated dimethylpolysiloxane having a viscosity of 10,000 centipoise (10 Pa.s) and a vinyl content of 0.12 wt %, 30 parts dry-method silica having a specific surface of 200 m$^2$/g, 0.1 part of an isopropanol solution of chloroplatinic acid solution equivalent to a platinum content of 3 wt %, and 0.08 parts of a 40% solution dicumyl peroxide in dibutyl phthalate.

The cavity of a press-molding metal mold that had previously been coated with the methylhydrogenpolysiloxane described in Example 1 to a thickness equivalent to a weight of 5 g/m$^2$ was filled with the liquid silicone rubber composition described in this Example, followed by curing of the composition at 170 degrees C. for 10 minutes.

The cured molding had a hard surface layer and a relatively soft gel-form interior portion. The interior portion had a hardness value of 5 measured using a JIS Hardness Meter, and the impact resilience of the cured article was 10%.

EXAMPLE 5

A silicone molding was produced as described in Example 1 of the present specification, with the exception the entire surface of the mold cavity was coated with 0.5 parts of a methylhydrogenpolysiloxane composed of Me$_2$HSiO$_{1/2}$ units and SiO$_2$ units and having a silicon-bonded hydrogen atom content of 1.2% instead of the methylhydrogenpolysiloxane described in the preceding example 1. A heat curable liquid silicone rubber composition was then placed in the mold cavity, and material in the mold cavity was then thermally cured. The resultant unitary silicone molding was composed of a relatively soft interior portion and a hard, uniform and smooth exterior layer.

That which is claimed is:

1. A method for producing a unitary silicone rubber molding comprising a hard exterior layer and a relatively soft interior portion, said method comprising the sequential steps of
    (1) coating an organohydrogenpolysiloxane having at least 2 silicone-bonded hydrogen atoms in each molecule on the surface of a mold cavity,
    (2) filling said mold cavity with a liquid silicone rubber composition that cures in the presence of heat by a reaction selected from the group consisting of hydrosilation type addition reactions conducted in the presence of a platinum catalyst, free reactions initiated by an organoperoxide and condensation reactions involving silicon-bonded hydroxyl groups, and
    (3) thermally curing said organohydrogenpolysiloxane and said liquid silicone rubber composition by heating the contents of said mold cavity to a temperature of from 50 to 220 degrees C.

2. A method according to claim 1 where said liquid silicone rubber composition is curable by a platinum-catalyzed hydrosilation reaction or a free radical reaction conducted in the presence of an organic peroxide.

3. A method according to claim 2 where said liquid silicone rubber composition is curable by a platinum-catalyzed hydrosilation reaction and comprises
    (A) an organopolysiloxane containing at least 2 lower alkenyl radicals in each molecule,
    (B) an organohydrogenpolysiloxane having at least 2 silicon-bonded hydrogen atoms in each molecule, in an amount sufficient to provide from 0.1 to 1 mole of silicon-bonded hydrogen atoms for each mole of lower alkenyl radicals present in component (A), and
    (C) a platinum-type catalyst in an amount equivalent to from 0.1 to 1,000 parts by weight of platinum metal for each 1,000,000 weight parts of the total quantity of components (A) and (B),
where the sum of the number of alkenyl radicals in each molecule of component (A) and the number of hydrogen atoms in each molecule of component (B) be at least 5.

4. A method according to claim 3 where the molar ratio of silicon-bonded hydrogen atoms to alkenyl radicals in said liquid silicone rubber composition is from 0.1 to 1, said alkenyl radicals are vinyl, and said composition is cured at a temperature of from 50 to 220 degrees C.

5. A method according to claim 1 where the molecular configuration of said organohydrogenpolysiloxane is branched.

6. A method according to claim 5 where said organohydrogenpolysiloxane is a methylhydrogenpolysiloxane.

7. A method according to claim 4 where said organopolysiloxane is a diorganopolysiloxane the silicon-bonded hydrocarbon radicals other than vinyl are methyl or a mixture of methyl and 3,3,3-trifluoropropyl, component B is a methylhydrogenpolysiloxane and the molar ratio of silicon-bonded hydrogen atoms to vinyl radicals in said liquid silicone rubber composition is from 0.4 to 0.6.

* * * * *